US007975534B2

(12) United States Patent
Mc Donald et al.

(10) Patent No.: US 7,975,534 B2
(45) Date of Patent: Jul. 12, 2011

(54) CRANKSHAFT REVERSAL DETECTION SYSTEMS

(75) Inventors: Mike M. Mc Donald, Macomb, MI (US); William C. Albertson, Clinton Township, MI (US)

(73) Assignee: GM Global Technology Operations, Inc.

( * ) Notice: Subject to any disclaimer, the term of this patent is extended or adjusted under 35 U.S.C. 154(b) by 309 days.

(21) Appl. No.: 12/185,338

(22) Filed: Aug. 4, 2008

(65) Prior Publication Data

US 2010/0029421 A1 Feb. 4, 2010

(51) Int. Cl.
*G01M 15/06* (2006.01)

(52) U.S. Cl. .................................................... 73/114.26

(58) Field of Classification Search ............... 73/114.26, 73/114.27, 114.28, 114.77, 114.79
See application file for complete search history.

(56) References Cited

U.S. PATENT DOCUMENTS

| | | | | |
|---|---|---|---|---|
| 5,079,945 | A * | 1/1992 | Hansen et al. | 73/114.03 |
| 6,578,550 | B1 * | 6/2003 | Rupp et al. | 123/406.13 |
| 7,640,907 | B2 * | 1/2010 | Nakamura | 123/179.1 |
| 7,669,569 | B2 * | 3/2010 | Tamai et al. | 123/179.4 |
| 2005/0203695 | A1 * | 9/2005 | Kassner | 701/114 |
| 2005/0212509 | A1 * | 9/2005 | Asama | 324/207.2 |
| 2006/0162701 | A1 * | 7/2006 | Kassner | 123/479 |
| 2008/0173079 | A1 * | 7/2008 | McGee et al. | 73/114.26 |
| 2008/0268726 | A1 * | 10/2008 | Akuzawa | 440/1 |
| 2010/0241302 | A1 * | 9/2010 | Shimizu | 701/29 |

* cited by examiner

*Primary Examiner* — Eric S McCall

(57) ABSTRACT

A crankshaft reversal detection system includes a sensor module and a control module that communicates with the sensor module. The sensor module detects position of a belt tensioner that communicates with a crankshaft driven accessory drive belt. The control module determines a rotational direction of the crankshaft pulley based on the position of the belt tensioner.

18 Claims, 8 Drawing Sheets

CRANKSHAFT REVERSAL DETECTION SYSTEMS

FIELD

The present disclosure relates to internal combustion engines, and more particularly to crankshaft reversal detection systems for internal combustion engines at engine stop.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

An internal combustion engine generally includes multiple cylinders that operate sequentially under an intake stroke, a compression stroke, a combustion stroke and an exhaust stroke. When the engine stops, one of the cylinders may be in a compression stroke (i.e., where the gas charge is compressed). The compressed charge may push the cylinder down when the engine stops, causing the crankshaft to rotate in a reverse direction. If the reverse rotation of the crankshaft is not detected, the final rest position of the crank and cam shafts may be difficult to discern, thus making restarting of the engine more difficult.

Sensors may be used to monitor an angular movement of the crankshaft but most often cannot determine whether a reverse rotation of the crankshaft has occurred. Upon restarting the engine, it may take an entire rotation of the crankshaft to determine whether a reverse rotation has occurred. As a result, the operation of the engine may be delayed when re-starting.

SUMMARY

Accordingly, a crankshaft reversal detection system includes a sensor module and a control module that communicates with the sensor module. The sensor module detects position of an accessory drive belt that communicates with a crankshaft pulley. The control module determines a rotational direction of the crankshaft pulley based on the position of the accessory drive belt.

A method of determining crankshaft reversal includes determining the position of an accessory drive belt associated with a crankshaft pulley, and determining a rotational direction of the crankshaft pulley based on the position of the accessory drive belt.

In other features, the sensor module detects position of a belt tensioner that communicates with the accessory drive belt. The control module determines the rotational direction of the crankshaft pulley based on the position of the belt tensioner.

In other features, the sensor module includes a switch. The belt tensioner changes from a first position to a second position after the crankshaft pulley rotates in a reverse direction. A portion of the belt adjacent to the switch is tensioned more in the second position than in the first position.

In other features, the control module determines if a reverse rotation occurs when a belt slip occurs at a driven pulley. The sensor module includes a speed sensor for the driven pulley. A crankshaft speed sensing module determines a crankshaft speed based on signals from a crankshaft position sensor. The control module includes a speed comparison module that compares the speed of the driven pulley with the crankshaft speed. The driven pulley is at a tight side of the belt when the crankshaft rotates in a forward direction. The control module determines a reverse rotation occurs when the crankshaft speed is not equal to a predetermined scaled speed of the driven pulley.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is in no way intended to limit the disclosure, its application, or uses. It should be understood that steps within a method may be executed in different order without altering the principles of the present disclosure. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The crankshaft reversal detection system in accordance with the teachings of the present disclosure monitors a position of an engine accessory drive belt that communicates with a crankshaft. In particular, the position of a belt tensioner that communicates with the crankshaft driven accessory drive belt is monitored. After reversal of the crankshaft occurs, a portion of the belt that is initially at a slack side becomes a tight side, thereby moving the belt tensioner from a first position to a second position. Alternatively, the accessory drive belt may change its position due to crankshaft reversal to result in a belt slip on a driven pulley. The driven pulley is initially at the tight side when the crankshaft rotates in a forward direction. A sensor module may be provided adjacent to the belt tensioner or the driven pulley to monitor the slack change of the belt.

At the outset, it is understood that while only the rotational direction of a crankshaft pulley is discussed throughout the present disclosure, the rotational direction and the rotational speed of a crankshaft are analogous to the rotational direction and the rotational speed of the crankshaft pulley 12 as discussed herein.

Figure 1:
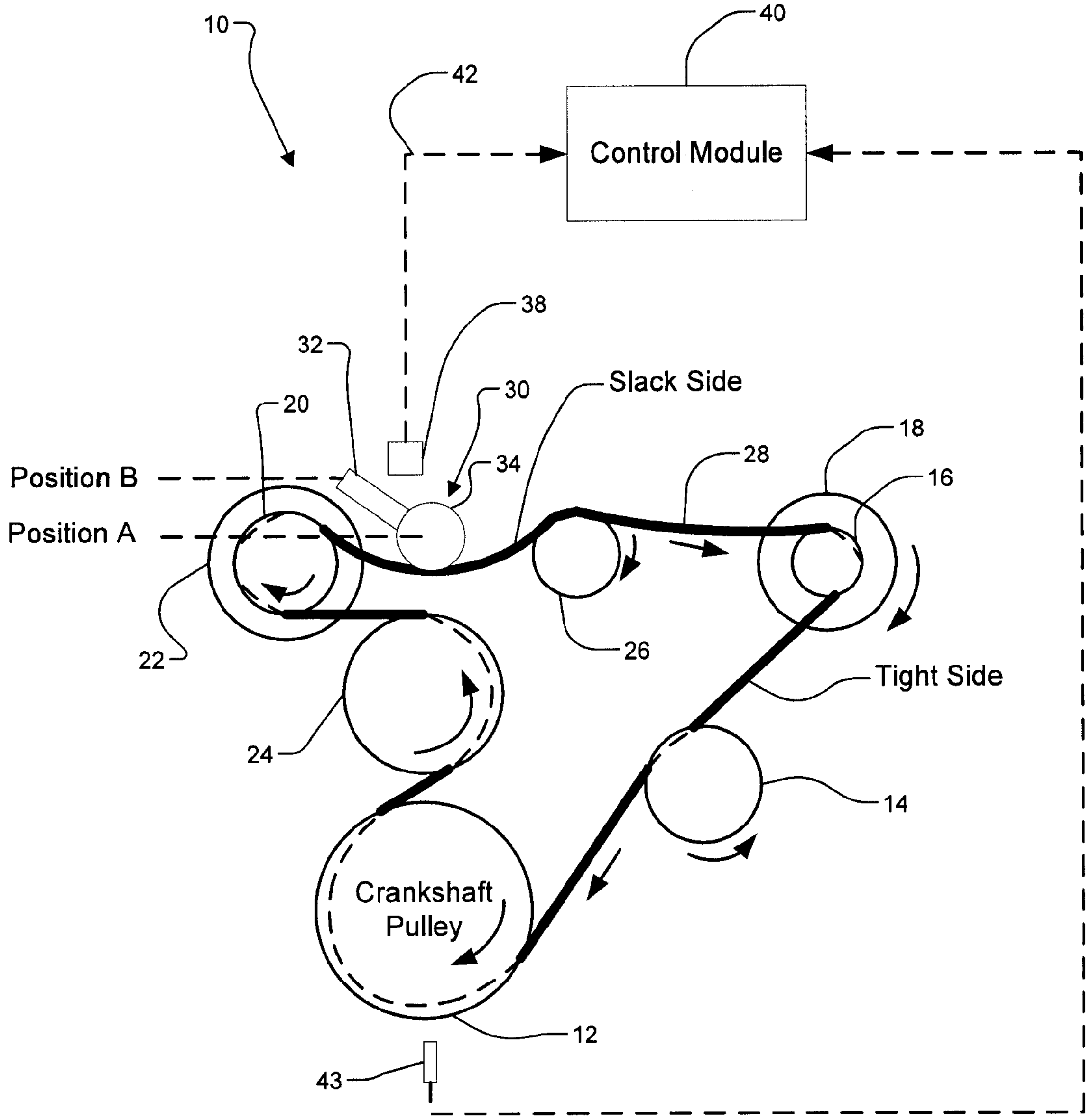
FIG. 1 is a block diagram of a crankshaft reversal detection system in accordance with a first embodiment of the present disclosure, wherein a crankshaft pulley rotates in a forward direction.
Figure 2:
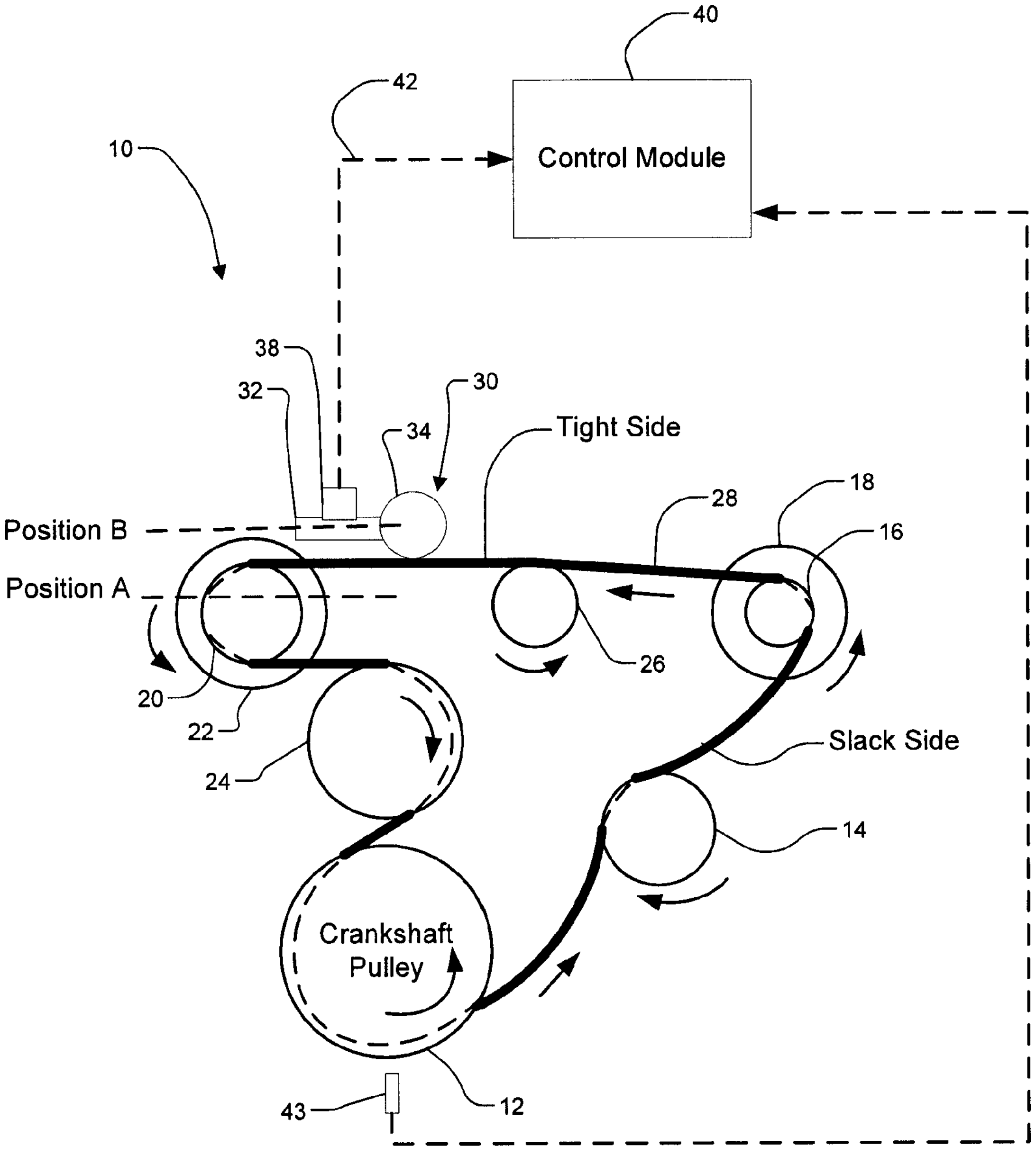
FIG. 2 is a block diagram of a crankshaft reversal detection system of FIG. 1, wherein a crankshaft pulley rotates in a reverse direction in accordance with the teachings of the present disclosure.

Referring to FIGS. 1 and 2, a crankshaft reversal detection system 10 includes a crankshaft pulley 12 mounted to a crankshaft (not shown) of an internal combustion engine (not shown) and a number of driven pulleys for engine accessory devices. These driven pulleys include, but are not limited to, a driven pulley 14 for a water pump, a driven pulley 16 for an alternator 18, a driven pulley 20 for a power steering pump 22, and a driven pulley 24 for an air conditioner compressor. An idle pulley 26 is provided between the driven pulleys 16 and 20. An accessory drive belt 28 encircles the crankshaft pulley 12, the driven pulleys 14, 16, 20, 24 for the accessory devices, and the idle pulley 26. When the crankshaft pulley 12 rotates, the drive force from the crankshaft pulley 12 is transmitted to the pulleys 14, 16, 20, and 24 to drive the associated accessory devices. It is appreciated that the arrangement of the driven pulleys and the associated accessory devices can be different from that shown in FIG. 1.

Typically, the alternator 18 has the highest inertia and the greatest drive ratio of the belt driven accessories. As a result, when the crankshaft pulley 12 rotates, one portion of the belt 28 at one side of the alternator driven pulley 16 is in a condition different from another portion of the belt 28 at the other side of the alternator driven pulley 16. More specifically, when the crankshaft pulley 12 rotates in a forward direction (for example, the clockwise direction as shown in FIG. 1), the portion of the belt 28 from the crankshaft pulley 12 through the driven pulley 14 to the driven pulley 16 corresponds to a tight side. The remaining portion of the belt 28 corresponds to a slack side. Conversely, when the crankshaft pulley 12 rotates in a reverse direction (i.e., the counter clockwise direction as shown in FIG. 2), the portion of the belt 28 from the crankshaft pulley 12, through the driven pulley 14, to the driven pulley 16 is at the slack side. The remaining portion of the belt 28 is at the tight side.

The tight side refers to the portion of the belt 28 that enters the crankshaft pulley 12. The slack side refers to the portion of the belt 28 that leaves the crankshaft pulley 12. Generally, the tension of the belt at the tight side is greater than that at the slack side.

A belt tensioner 30 contacts the belt 28 to maintain a proper tension of the accessory drive belt 28. The belt tensioner 30 includes a swing arm 32 and an idle pulley 34 mounted on the swing arm 32. The swing arm 32 and the swing arm mounted idle pulley 34 are urged toward the flat side of the belt by an appropriate force usually supplied by an integral spring (not shown). The idle pulley 34 runs against a flat back surface of the belt 28. The swing arm 32 swings to move the idle pulley 34 so that a proper tensioning force can be maintained in the belt 28. When the crankshaft pulley 12 rotates in the forward direction, the portion of the belt adjacent to the tensioner 30 is at the slack side and the idle pulley 34 is at Position A. When the crankshaft pulley 12 rotates in the reverse direction, the portion of the belt 28 adjacent to the tensioner 30 is at the tight side and the idle pulley 34 of the tensioner 30 is moved to Position B. The position of the belt 28 slack may be monitored by monitoring the position of the idle pulley 34 of the belt tensioner 30.

A sensor module 38 is provided adjacent to the tensioner 30 to monitor the position of the tensioner 30 and consequently the accessory drive belt 28. The sensor module 38 may include a switch, including but not limited to, an over-travel switch, a contact switch and a proximity switch. When the crankshaft pulley 12 rotates in a forward direction, the portion of the belt 28 adjacent to the sensor module 38 is slack and the belt is at a first position corresponding to Position A. The belt tensioner 30 is not in contact with or in the proximity of the switch to actuate the switch. When the crankshaft pulley 12 rotates in a reverse direction, the idle pulley 34 is moved to position B and the belt 28 is in the second position. The idle pulley 34 of the belt tensioner 30 becomes in contact with or in the proximity of the switch to actuate the switch. The switch generates and sends a signal 42 to a control module 40 indicating that the belt 28 is in the second position. Therefore, the control module 40 determines that the crankshaft pulley 12 is in a reverse rotation.

While not shown in the drawings, it is understood and appreciated that the switch may be a rotary switch that is mounted on a pivot (not shown) of the tensioner 30. When the belt 28 moves the idle pulley 34 of the tensioner 30 to Position B, the swing arm 32 of the tensioner 30 is pivoted and the pivot is rotated a predetermined degree of angle to actuate the rotary switch.

A crankshaft position sensor 43 may be provided adjacent to the crankshaft pulley 12 (or the crankshaft). The crankshaft position sensor 43 may include a hall effect sensor that continuously generates cyclic output as a notch of a wheel associated with the crankshaft pulley passes a pickup sensor. The crankshaft position sensor 43 continues to generate cyclic output regardless of rotational direction of the crankshaft pulley.

Figure 3:
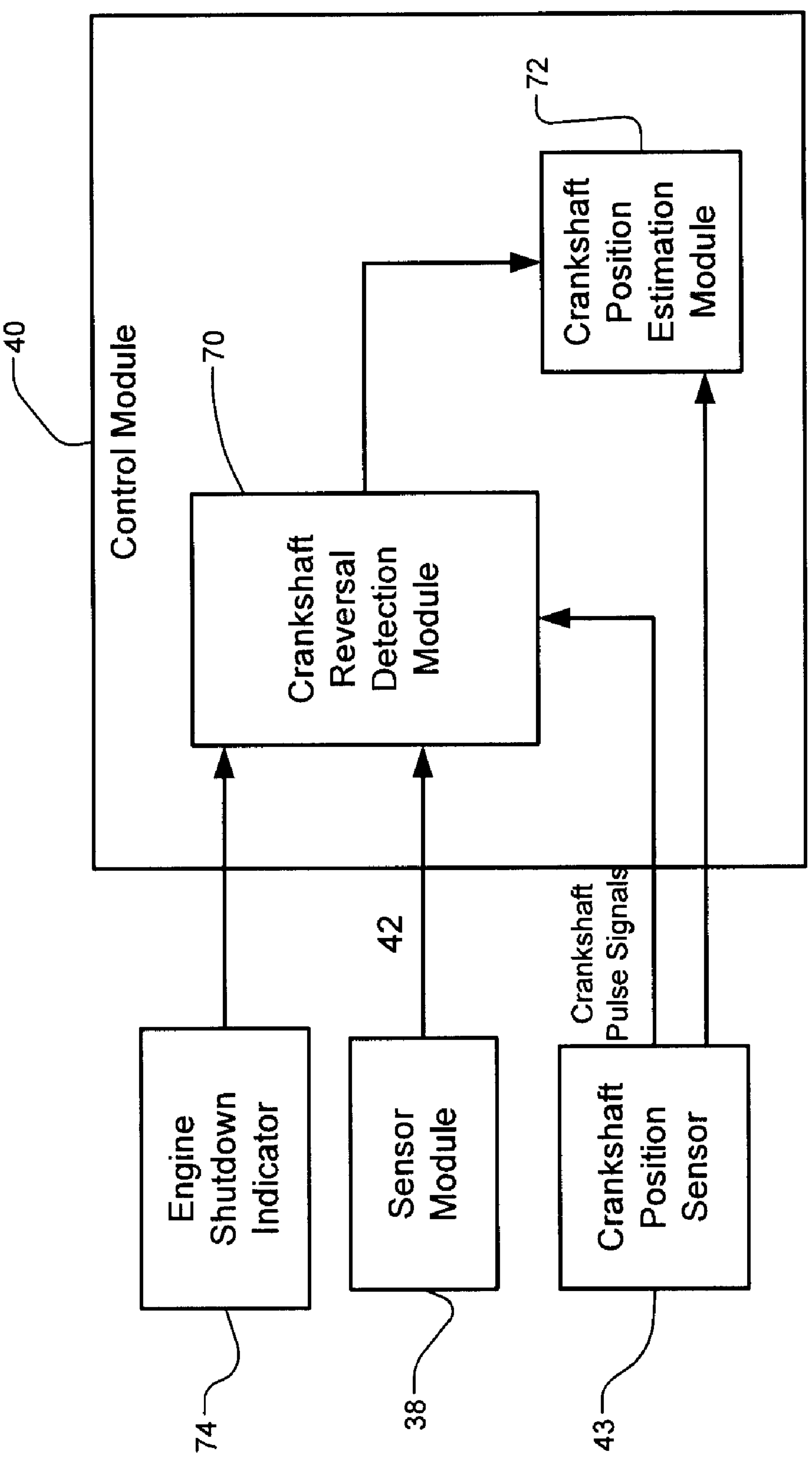
FIG. 3 is a block diagram of a control module that communicates with a crankshaft reversal detection system of FIGS. 1 to 2 in accordance with the teachings of the present disclosure.
Figure 4:
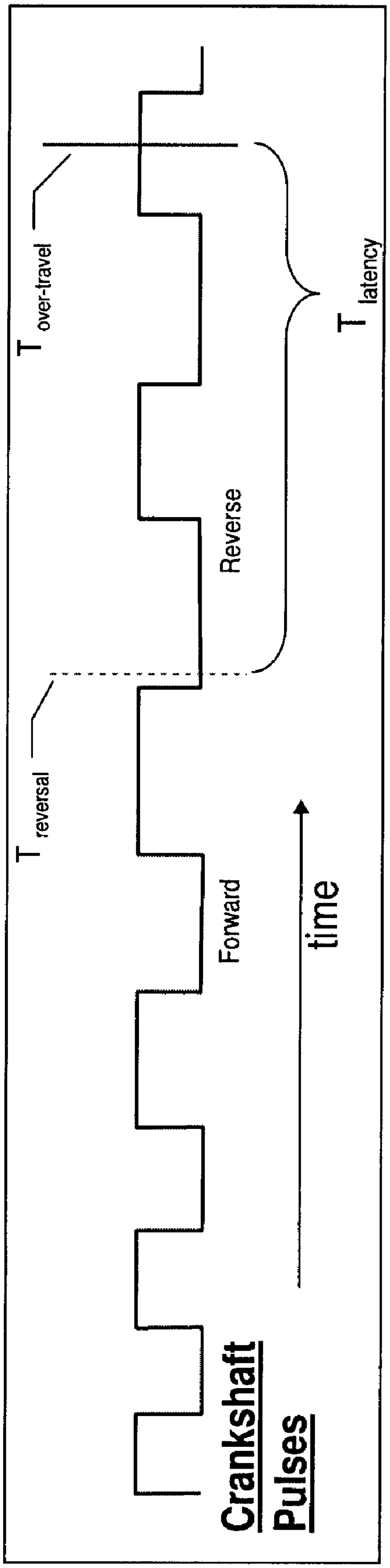
FIG. 4 is an exemplary crankshaft pulse timing diagram illustrating the reversal time and the over-travel time in terms of the crankshaft pulse signals.

Referring to FIGS. 3 and 4, the control module 40 for the crankshaft reversal detection system 10 includes a crankshaft reversal detection module 70 and a crankshaft position estimation module 72. The crankshaft reversal detection module 70 communicates with an engine shutdown indicator 74, the sensor module 38, and the crankshaft position sensor 43. The crankshaft position estimation module 72 communicates with the crankshaft reversal detection module 70 and the crankshaft position sensor 43. When an engine is commanded to be shut down, the engine shutdown indicator 74 sends a signal to the control module 40 indicating an engine shutdown event.

Referring to FIG. 4, when the engine shutdown indicator 74 sends a signal indicating an engine shutdown event, the crankshaft reversal detection module 70 is actuated to start recording pulse signals from the crankshaft position sensor 43. After the engine is shut down, the crankshaft may continue to rotate and the crankshaft reversal detection module 70 records the pulse signals. When crankshaft reversal occurs at $T_{reversal}$, the sensor module 38 (for example, a switch) is actuated to generate and send a signal to the crankshaft reversal detection module 70. The crankshaft position estimation module 72 continues to record the pulse signals from the crankshaft position sensor 43 without distinguishing between the forward direction and the reverse direction of the crankshaft.

When the crankshaft reversal detection module 70 receives the signal from the sensor module 38, the crankshaft reversal detection module 70 records a time stamp for this event ($T_{over\text{-}travel}$). The time ($T_{over\text{-}travel}$) is not the time when the crankshaft reversal starts (i.e., $T_{reversal}$) because of a time delay ($T_{latency}$) between the crankshaft starting to rotate in reverse, and delivery of the signal 42 from the sensor module 38 to the crankshaft reversal detection module 70. Therefore, the amount of time ($T_{latency}$) required to deliver the signals to the crankshaft reversal detection module 70 needs to be subtracted from the time ($T_{over-travel}$) to obtain the time when the reverse rotation starts.

The moment that the crankshaft reversal starts is determined based on the following equation:

$$T_{reversal}=T_{over-travel}-T_{latency}$$

In the equation, $T_{reversal}$ is the time when crankshaft reversal starts; $T_{over-travel}$ is the time when the crankshaft reversal detection module 70 receives and records the signal from the sensor module 38; and $T_{latency}$ is a time delay between when the crankshaft rotates in reverse and the moment the crankshaft reversal determination 70 records the signal from the sensor module 38. $T_{latency}$ is a calibratable value that can be determined using physical models of the crankshaft reversal system 10.

Referring back to FIG. 3, after the crankshaft reversal time is determined, a signal corresponding to the crankshaft reversal time is sent to the crankshaft position estimation module 72 to estimate the crankshaft position. The crankshaft position estimation module 72 continuously receives signal pulses from the crankshaft position sensor 43 corresponding to the position of the crankshaft. The crankshaft position estimation module 72 may subtract the amount of reverse rotation from the signal pulses from the crankshaft position sensor 43 to determine a final crankshaft position.

Figure 5:
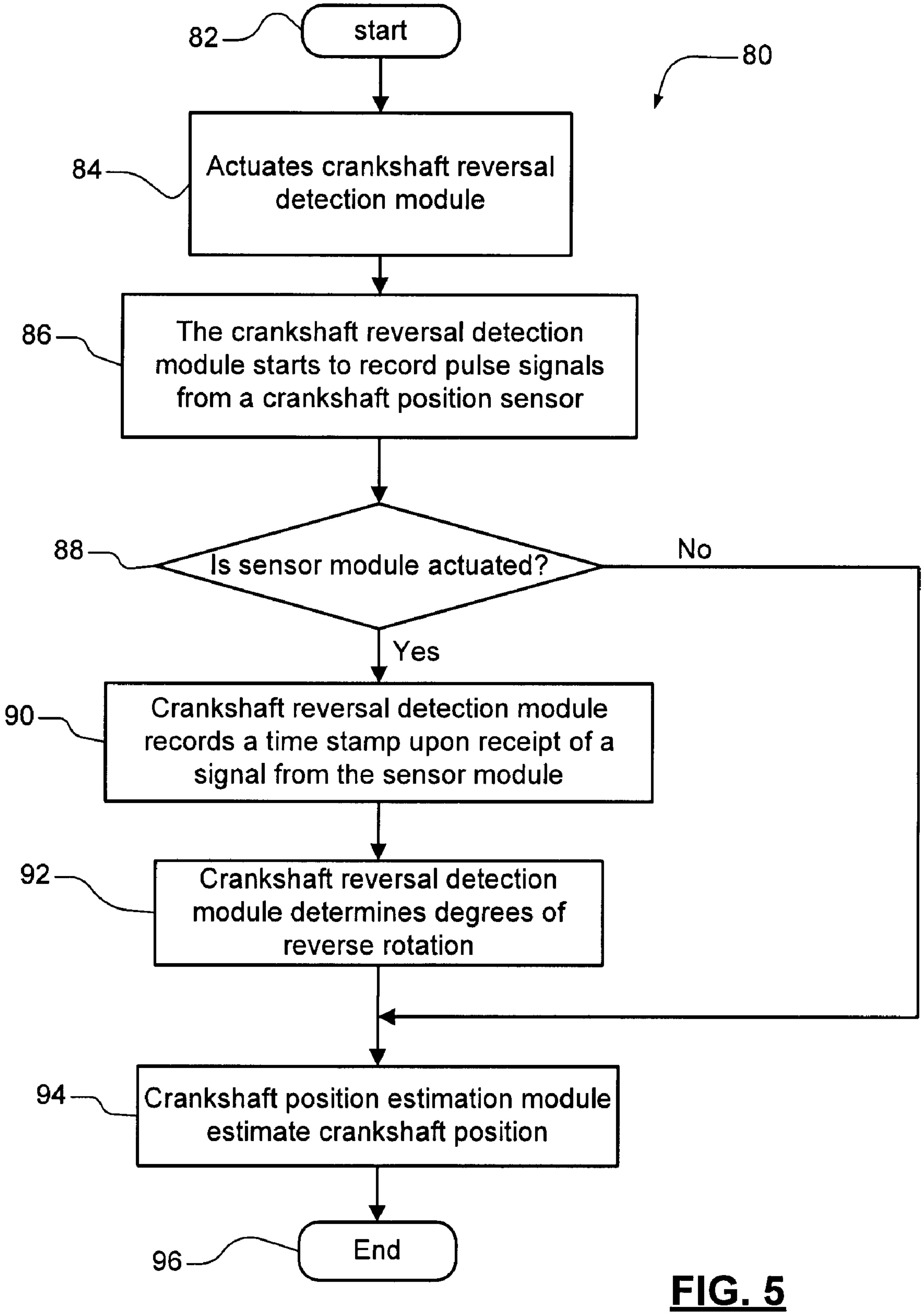
FIG. 5 is a flow diagram of a method of determining crankshaft reversal in accordance with the teachings of the present disclosure.

Referring to FIG. 5, a method 80 of determining a crankshaft position at engine stop starts in step 82. When an engine is shut down, an engine shutdown indicator 74 sends a signal to the crankshaft reversal detection module 70 to actuate the crankshaft reversal detection module in step 84. The crankshaft reversal detection module 70 starts to record pulse signals and time stamps from the crankshaft position sensor in step 86. When a reverse rotation of the crankshaft pulley 12 occurs, the belt 28 is moved from the first position to the second position to actuate a switch of the sensor module 38. In step 88, when being actuated, the sensor module 38 sends a signal to the crankshaft reversal detection module 70. Upon receipt of the signal 42 indicating reverse rotation, the crankshaft reversal detection module 70 records a time stamp in step 90. The crankshaft reversal detection module 70 then determines the degrees of reverse rotation in step 92. The crankshaft position determination module 72 then determines the position of the crankshaft based on the reversal time and the pulse signals from the crankshaft position sensor 43 in step 94. The method 80 ends at step 96.

Figure 6:
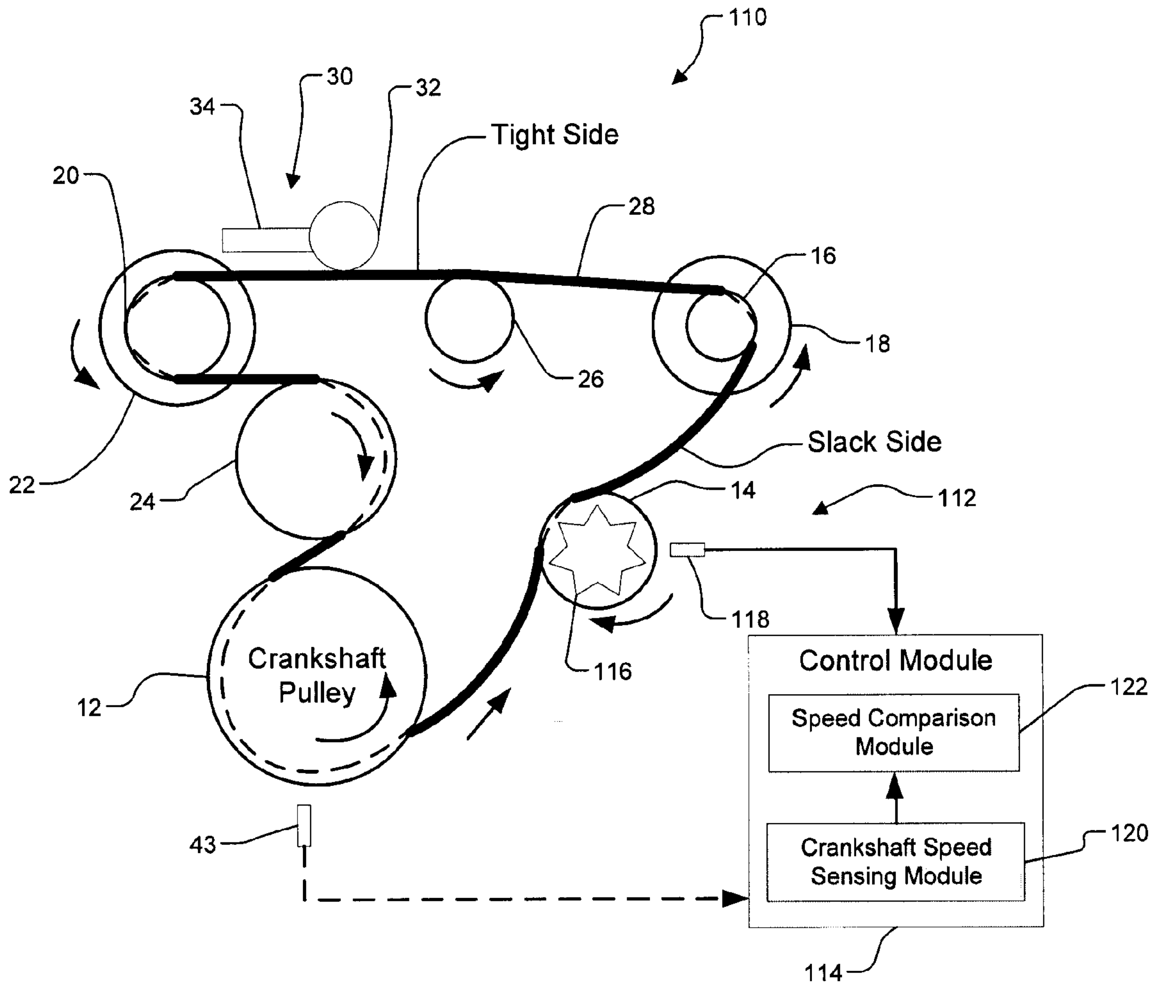
FIG. 6 is a block diagram of a crankshaft reversal detection system in accordance with a second embodiment of the present disclosure.

Referring to FIG. 6, a crankshaft reversal detection system 110 in accordance with a second embodiment of the present disclosure may include a sensor module 112 that communicates with a control module 114. In the present embodiment, the control module 114 determines a crankshaft reverse rotation based on a belt slip on a driven pulley. When the accessory drive belt changes its position due to a crankshaft reverse rotation, a belt slip may occur at the driven pulley. The belt slip may be determined by comparing the speed of the driven pulley and the speed of the crankshaft pulley.

The sensor module 112 includes a speed sensor for the driven pulley 14, and a crankshaft position sensor 43. The speed sensor for the driven pulley 14 includes a pickup sensor 118 and an encoder wheel 116 mounted on the driven pulley 14 and provided with a plurality of position indicators or markers. The pickup sensor 118 measures a rotational speed of the driven pulley 14. The crankshaft position sensor 43 detects the position of the crankshaft.

The control module 114 includes a crankshaft speed sensing module 120 and a speed comparison module 122. The crankshaft speed sensing module 120 uses the signal from the crankshaft position sensor 43 to determine a crankshaft speed and sends a train of pulse signals to the speed comparison module 122 corresponding to the crankshaft speed. The speed sensor of the driven pulley 14 also sends signals to the speed comparison module 122 corresponding to a speed of the driven pulley 14. When the indicators or markers on the encoder wheel 116 pass the pickup sensor 118, a train of pulse signals are generated and sent to the speed comparison module 122. The pulse signals from the pickup sensor 118 can be analyzed to determine the speed of the driven pulley 14. The speed of the driven pulley 14 and the crankshaft speed are compared to determine whether a belt slip occurs at the driven pulley 14 and consequently whether a reverse rotation occurs.

It is noted that when multiple driven pulleys are provided between the alternator driven pulley 16 and the driven pulley 14, the encoder wheel 116 may be mounted on the driven pulley that is closest to the alternator driven pulley 16.

Figure 7:
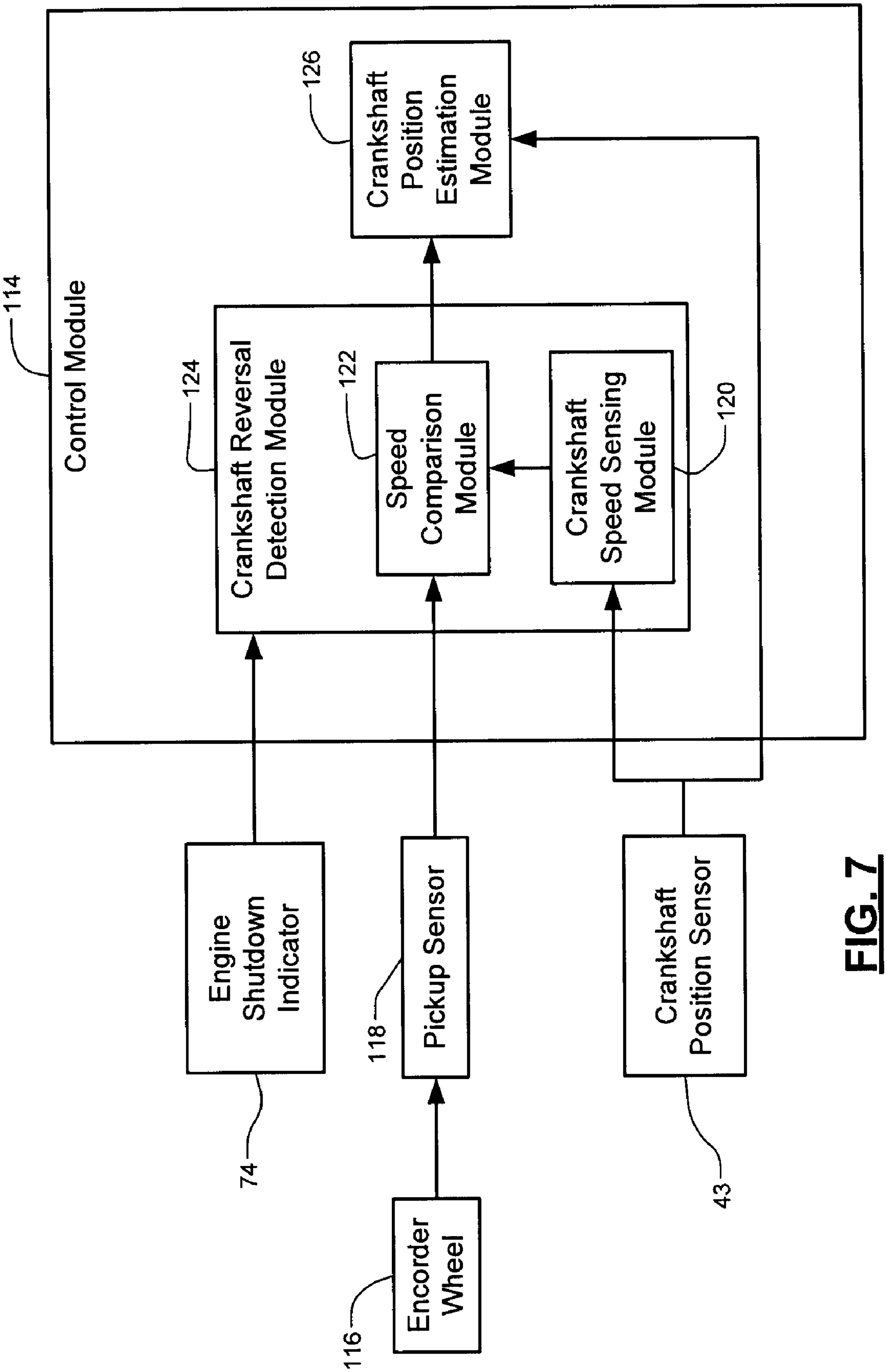
FIG. 7 is a block diagram of a control module that communicates with a crankshaft reversal detection system of FIG. 6 in accordance with the teachings of the present disclosure.

Referring to FIG. 6 and FIG. 7, the control module 114 for the crankshaft reversal detection system 110 includes a crankshaft reversal detection module 124 and a crankshaft position estimation module 126. The crankshaft reversal detection module 124 communicates with the engine shutdown indicator 74, the crankshaft position sensor 43, and the pickup sensor 118. The crankshaft reversal detection module 124 includes the crankshaft speed sensing module 120 and the speed comparison module 122.

When the engine is commanded to be shut down, the engine shutdown indicator 74 sends a signal to the control module 114 to actuate the crankshaft reversal detection module 124. The crankshaft reversal detection module 124 starts to record crankshaft pulse signals from the crankshaft position sensor 43 and time stamps for each pulse. The crankshaft position sensor 43 also sends pulse signals to the crankshaft position estimation module 126.

When the crankshaft pulley 12 rotates in the forward direction, the portion of the belt 28 adjacent to the driven pulley 14 and the encoder wheel 116 is at the tight side. The driven pulley 14 rotates at a rotational speed that is a multiple of the speed of the crankshaft pulley (or crankshaft).

The pulse signals sent by the pickup sensor 118 may be compared with the signals from a crankshaft speed sensing module 120 to determine whether the rotational speed of the crankshaft pulley 12 (or crankshaft speed) is equal to a scaled rotational speed of the driven pulley 14. If the rotational speed of the crankshaft pulley 12 (or the crankshaft speed) is equal to the scaled rotational speed of the driven pulley 14, it may be determined that the portion of the belt 28 adjacent to the driven pulley 14 is tight, indicating that the crankshaft pulley 12 is rotating in the forward direction.

When the crankshaft pulley 12 rotates in the reverse rotation as shown in FIG. 6, the portion of the belt 28 adjacent to the driven pulley 14 is slack and a belt slip occurs at the driven pulley 14. As a result, the rotational speed of the driven pulley 14 is not a constant multiple of, or synchronous with the rotational speed of the crankshaft pulley 12.

The speed comparison module 122 compares the rotational speed of the driven pulley 14 with the rotational speed of the crankshaft pulley 12. The speed ratio of the driven pulley 14 to the crankshaft pulley 12 may be determined by analyzing the signals from the pickup sensor 118 and the signal from the crankshaft speed sensing module 120. If the speed ratio changes significantly, it is determined that the belt 28 slipped relative to the driven pulley 14.

The crankshaft reversal detection module 124 records a time stamp for this event ($T_{slip}$). The time ($T_{slip}$) is not the time when the reverse rotation starts due to a time delay between the start of crankshaft reverse rotation and delivering signals from the pickup sensor to the speed comparison module 122 and in processing the signals in the speed comparison module. The crankshaft reversal detection module 124 may subtract an amount of time ($T_{latency}$) from $T_{slip}$ to account for latency in the electromechanical belt/sensor/circuit subsystem. The point in time at which the crankshaft reversal starts can be determined based on the following equation:

$$T_{reversal}=T_{slip}-T_{latency}$$

In the equation, $T_{reversal}$ is the instant in time that a reverse rotation starts; $T_{slip}$ is the instant in time when a slip event is detected; and $T_{latency}$ is a time delay between the moment the crankshaft rotation reversal and the moment the signal is detected in the crankshaft reversal detection module 124. $T_{latency}$ is a calibrated value that can be generated using models of the crankshaft reversal detection system 110.

After the crankshaft reversal time is determined, a signal corresponding to the reversal rotation time is sent to the crankshaft position estimation module 126 to estimate the crankshaft position. The crankshaft position estimation module 126 then determines the position of the crankshaft based on the reversal time and the position determined by the crankshaft speed sensing module 120.

Figure 8:
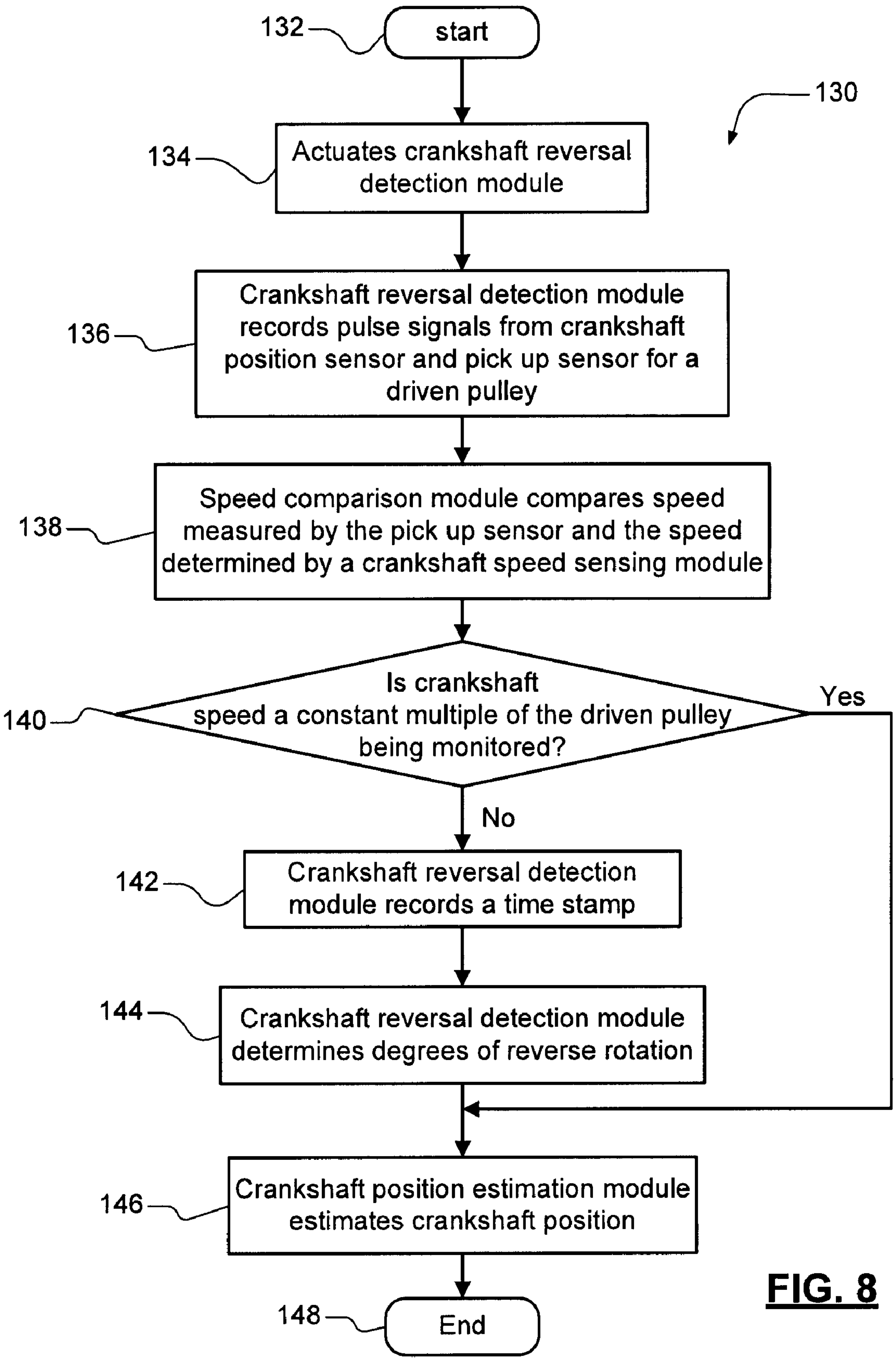
FIG. 8 is a flow diagram of a method of determining crankshaft reversal in accordance with a second embodiment of the present disclosure.

Referring to FIG. 8, a method 130 of determining a crankshaft position at engine stop starts in step 132. When an engine is commanded to shut down, an engine shutdown indicator 74 sends a signal to actuate the crankshaft reversal detection module in step 134. The crankshaft reversal detection module 124 starts to record pulse signals from the crankshaft position sensor 43 and time stamps for each pulse in step 136. The speed comparison module compares the signals from the pickup sensor 118 and the crankshaft speed sensing module 120 in step 138. If the crankshaft speed is not a constant multiple of the driven pulley in step 140, it is determined that a reverse rotation of the crankshaft pulley occurs. The crankshaft reversal detection module records a time stamp for this slip event in step 142. The crankshaft reversal detection module determines the degrees of reverse rotation in step 144. A signal corresponding to the reverse time is sent to the crankshaft position estimation module 126 that estimates the crankshaft position in step 146. The method ends in step 148.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A crankshaft reversal detection system comprising:

a sensor module that detects a position of an accessory drive belt that communicates with a crankshaft pulley;

a control module that communicates with the sensor module and that determines a rotational direction of the crankshaft pulley based on the position of the belt; and a belt tensioner that communicates with the accessory drive belt, wherein the control module determines the rotational direction of the crankshaft pulley based on a position of the belt tensioner.

2. The crankshaft reversal detection system of claim 1 wherein the belt tensioner is moved from a first position to a second position when the crankshaft pulley changes from rotation in a forward direction to rotation in a reverse direction.

3. The crankshaft reversal detection system of claim 2 wherein the sensor module includes a switch.

4. The crankshaft reversal detection system of claim 3 wherein the switch includes at least one of a contact switch, an over-travel switch, a proximity switch, and a rotary switch.

5. The crankshaft reversal detection system of claim 3 wherein the switch is provided at the belt tensioner.

6. The crankshaft reversal detection system of claim 3 wherein the switch is actuated when the belt tensioner is moved toward the switch.

7. The crankshaft reversal detection system of claim 6 wherein a portion of the belt adjacent to the switch is tensioned more in the second position than in the first position.

8. The crankshaft reversal detection system of claim 7 wherein the belt tensioner is at a tight side of the accessory drive belt in the second position.

9. A crankshaft reversal detection system comprising:

a sensor module that detects a position of an accessory drive belt that communicates with a crankshaft pulley; and a control module that communicates with the sensor module and that determines a rotational direction of the crankshaft pulley based on the position of the belt, wherein the control module determines a reverse rotation occurs when a belt slip occurs at a driven pulley, wherein the driven pulley is at a tight side when the crankshaft rotates in a forward direction.

10. The crankshaft reversal detection system of claim 9 further comprising a speed comparison module that determines the belt slip occurs based on a comparison of a speed of the driven pulley and a crankshaft speed.

11. The crankshaft reversal detection system of claim 10 wherein the control module determines that the crankshaft rotates in a forward direction when the crankshaft speed is equal to a predetermined scaled speed of the driven pulley.

12. The crankshaft reversal detection system of claim 10 further comprising a crankshaft speed sensing module that determines the crankshaft speed based on a signal from a crankshaft position sensor.

13. The crankshaft reversal detection system of claim 12 wherein the control module determines a reverse rotation occurs when the crankshaft speed is not equal to a predetermined scaled speed of the driven pulley.

14. A method of determining crankshaft reversal comprising:

determining a position of an accessory drive belt associated with a crankshaft pulley;

determining a rotational direction of the crankshaft pulley based on the position of the accessory drive belt; and determining the position of the accessory drive belt based on a position of a belt tensioner that communicates with the accessory drive belt.

15. The method of claim 14 further comprising actuating a switch when the belt tensioner is moved from a first position to a second position.

16. The method of claim 14 further comprising arranging a switch adjacent to a portion of the belt, wherein the portion of the belt is at a slack side when the crankshaft pulley rotates in a forward direction and at a tight side when the crankshaft rotates in a reverse direction.

17. The method of claim 14 further comprising monitoring a belt slip at a driven pulley that is at a tight side of the belt when the crankshaft pulley rotates in a forward direction.

18. The method of claim 17 further comprising determining the crankshaft pulley rotates in a reverse direction when a crankshaft speed is not a constant scaled speed of a speed of the driven pulley.

* * * * *